United States Patent
Michiels et al.

(10) Patent No.: US 9,641,337 B2
(45) Date of Patent: May 2, 2017

(54) INTERFACE COMPATIBLE APPROACH FOR GLUING WHITE-BOX IMPLEMENTATION TO SURROUNDING PROGRAM

(71) Applicant: NXP B.V., Eindhoven (NL)

(72) Inventors: Wil Michiels, Reusel (NL); Jan Hoogerbrugge, Helmond (NL); Michael Patrick Peeters, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/263,507

(22) Filed: Apr. 28, 2014

(65) Prior Publication Data

US 2015/0312042 A1  Oct. 29, 2015

(51) Int. Cl.
*H04L 9/32* (2006.01)
*H04L 9/06* (2006.01)

(52) U.S. Cl.
CPC .......... *H04L 9/3242* (2013.01); *H04L 9/0631* (2013.01); *H04L 9/0643* (2013.01); *H04L 9/3226* (2013.01)

(58) Field of Classification Search
CPC ... H04L 9/3242; H04L 9/0643; H04L 9/0631; H04L 9/3226
See application file for complete search history.

(56) References Cited

U.S. PATENT DOCUMENTS

| | | | |
|---|---|---|---|
| 7,392,384 B2 * | 6/2008 | Hopkins | H04L 9/0625 380/255 |
| 7,430,670 B1 * | 9/2008 | Horning | G06F 21/125 713/190 |
| 7,480,806 B2 * | 1/2009 | Grawrock | H04L 63/123 380/277 |
| 7,551,737 B2 * | 6/2009 | Camenisch | H04L 9/302 380/28 |
| 7,739,521 B2 * | 6/2010 | Brickell | G06F 7/723 380/30 |
| 8,151,109 B2 * | 4/2012 | Fanton | G06F 21/10 380/270 |
| 8,225,110 B2 * | 7/2012 | Stahl | G06F 21/10 713/189 |
| 8,479,016 B2 * | 7/2013 | Michiels | H04L 9/002 713/189 |

(Continued)

OTHER PUBLICATIONS

"Syncrosoft MCFACT—Secure Data Processing Technology", Retrust Sixth Quarterly Meeting, Mar. 11, 2008, Villach, Austria, 108 pages.

(Continued)

*Primary Examiner* — Joseph P Hirl
*Assistant Examiner* — Stephen Gundry

(57) ABSTRACT

A method of gluing a cryptographic implementation of a cryptographic function to a surrounding program in a cryptographic system, including: receiving, by the cryptographic system, an input message; receiving a computed value from the surrounding program; performing, by the cryptographic system, a keyed cryptographic operation mapping the input message into an output message using the computed value from the surrounding program, wherein the output message is a correct output message when the computed value has a correct value; and outputting the output message.

29 Claims, 5 Drawing Sheets

(56) References Cited

U.S. PATENT DOCUMENTS

| | | | | |
|---|---|---|---|---|
| 8,966,279 B2* | 2/2015 | Farrugia | ................ | H04L 9/002 713/189 |
| 2003/0191950 A1* | 10/2003 | Patel | ................ | H04L 9/0637 713/189 |
| 2004/0139340 A1* | 7/2004 | Johnson | ................ | G06F 21/14 713/194 |
| 2005/0138392 A1* | 6/2005 | Johnson | ................ | G06F 21/14 713/186 |
| 2007/0014394 A1 | 1/2007 | Harder et al. | | |
| 2007/0086586 A1* | 4/2007 | Jakubowski | ................ | H04L 9/0662 380/28 |
| 2007/0198838 A1* | 8/2007 | Nonaka | ................ | G06F 21/10 713/176 |
| 2008/0028474 A1* | 1/2008 | Horne | ................ | G06F 21/16 726/27 |
| 2009/0158051 A1* | 6/2009 | Michiels | ................ | H04L 9/002 713/189 |
| 2009/0254759 A1* | 10/2009 | Michiels | ................ | H04L 9/002 713/189 |
| 2009/0313480 A1* | 12/2009 | Michiels | ................ | G06F 21/10 713/187 |
| 2010/0080395 A1* | 4/2010 | Michiels | ................ | H04L 9/002 380/278 |
| 2010/0166069 A1* | 7/2010 | Goel | ................ | H04N 19/176 375/240.13 |
| 2010/0215173 A1* | 8/2010 | Michiels | ................ | G06F 21/10 380/28 |
| 2010/0296649 A1* | 11/2010 | Katzenbeisser | ................ | G06F 21/10 380/28 |
| 2010/0299515 A1* | 11/2010 | Michiels | ................ | G06F 21/10 713/150 |
| 2010/0303231 A1* | 12/2010 | Gorissen | ................ | H04L 9/065 380/210 |
| 2011/0064215 A1* | 3/2011 | Michiels | ................ | H04L 9/302 380/28 |
| 2011/0083020 A1* | 4/2011 | Michiels | ................ | H04L 9/004 713/189 |
| 2011/0091033 A1* | 4/2011 | Michiels | ................ | H04L 9/304 380/28 |
| 2011/0116625 A1* | 5/2011 | Michiels | ................ | G06F 21/14 380/28 |
| 2011/0150213 A1* | 6/2011 | Michiels | ................ | G06F 7/723 380/44 |
| 2011/0302422 A1* | 12/2011 | Farrugia | ................ | H04L 9/3242 713/181 |
| 2012/0002807 A1* | 1/2012 | Michiels | ................ | H04L 9/002 380/28 |
| 2012/0045050 A1* | 2/2012 | Farrugia | ................ | H04L 9/0631 380/28 |
| 2012/0093313 A1* | 4/2012 | Michiels | ................ | H04L 9/002 380/255 |
| 2012/0155638 A1* | 6/2012 | Farrugia | ................ | H04L 9/0631 380/45 |
| 2012/0159186 A1* | 6/2012 | Farrugia | ................ | H04L 9/002 713/189 |
| 2012/0163582 A1* | 6/2012 | Lee | ................ | H04L 9/0618 380/28 |
| 2012/0179919 A1* | 7/2012 | Farrugia | ................ | G06F 21/602 713/193 |
| 2012/0179920 A1* | 7/2012 | Farrugia | ................ | H04L 9/002 713/193 |
| 2013/0010963 A1* | 1/2013 | Farrugia | ................ | H04L 9/002 380/277 |
| 2013/0016836 A1* | 1/2013 | Farrugia | ................ | H04L 9/0631 380/255 |
| 2013/0061061 A1* | 3/2013 | Farrugia | ................ | G09C 1/00 713/190 |
| 2013/0067212 A1* | 3/2013 | Farrugia | ................ | H04L 9/0631 713/150 |
| 2014/0006803 A1* | 1/2014 | Bodis | ................ | G06F 21/125 713/189 |
| 2014/0019771 A1* | 1/2014 | Emmett | ................ | H04L 9/002 713/189 |
| 2014/0101458 A1* | 4/2014 | Farrugia | ................ | G06F 21/125 713/190 |
| 2015/0067441 A1* | 3/2015 | Gorissen | ................ | G06F 7/544 714/759 |
| 2016/0048689 A1* | 2/2016 | Wiener | ................ | H04L 9/004 713/189 |
| 2016/0050065 A1* | 2/2016 | Michiels | ................ | H04L 9/0631 380/28 |

OTHER PUBLICATIONS

Chow, Stanley et al., "A White-Box DES Implementation for DRM Applications", Digital Rights Management: ACM CCS-9 Workshop, DRM 2002, Washington, D.C., USA, Nov. 18, 2002, 1-16.

Chow, Stanley et al., "White-Box Cryptography and an AES Implementation", Cryptography: 9th Annual International Workshop, SAC 2002, St. John's, Newfoundland, Canada, Aug. 15, 2002.

European Search Report dated Sep. 28, 2015 received with EP COMM.

Delerablee, et al., White-Box Security Notions for Symmetric Encryption Schemes, International Association for Cryptologic Research, vol. 20130830:084255, Aug. 22, 2013, pp. 1-23.

Michiels, "Opportunities in white-box cryptography.", IEEE Security & Privacy, 8(1), 64-67, 2010.

* cited by examiner

```
void WB_AES (AESdata input, AESdata output)
{
...
y = T[x]
...
}
```

FIG. 5

```
void WB_AES (AESdata input, AESdata output)
{
...
/* C = T[r] ⊕ z  a constant */
if (x = = r)  y = z ⊕ C
else y = T[x]
...
}
```

FIG. 6

```
void WB_AES (AESdata input, AESdata output)
{
...
/* C = T[r] ⊕ (*p) a constant */
if (x = = r)  y = (*p) ⊕ C
else y = T[x]
...
}
```

FIG. 7

```
void WB_AES (AESdata input, AESdata output)
{
...
/* C = T[r] ⊕ z  a constant */
if (x = = r)  y = z ⊕ C
else y = T[x]
...
}
```

```
void g (...)
int z
{
...
/* calculate variable z to be the hash of
program fragment P */
z = Hash(P)
...
}
```

FIG. 8

```
int location
int *p = &location
int *q void f (...)
{
...
q = &location + 12
...
}
```

```
void g (...)
{
...
* (q − 12) = Hash (P)
...
}
```

FIG. 9

INTERFACE COMPATIBLE APPROACH FOR GLUING WHITE-BOX IMPLEMENTATION TO SURROUNDING PROGRAM

TECHNICAL FIELD

Various exemplary embodiments disclosed herein relate generally to interface compatible approach for gluing a white-box implementation to surrounding program.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of gluing a cryptographic implementation of a cryptographic function to a surrounding program in a cryptographic system, including: receiving, by the cryptographic system, an input message; receiving a computed value from the surrounding program; performing, by the cryptographic system, a keyed cryptographic operation mapping the input message into an output message using the computed value from the surrounding program, wherein the output message is a correct output message when the computed value has a correct value; and outputting the output message.

Various embodiments are described wherein the computed value is received from the surrounding program by a first pointer.

Various embodiments are described wherein the surrounding program sets the computed value pointed to by the first pointer using a second pointer.

Various embodiments are described wherein the input message and the output messages are unencoded.

Various embodiments are described wherein the computed value received from the surrounding program is based upon one of a hash value of a code fragment, a system identifier, a user password, and a hash of a user password.

Various embodiments are described wherein the computed value received from the surrounding program is based upon whether the cryptographic implementation is running in a debugger.

Various embodiments are described wherein the cryptographic implementation includes a network of functions and wherein when an input to a first function corresponds to a specific input, the output of the first function is determined based upon the received computed value.

Various embodiments are described wherein the cryptographic implementation includes a network of functions wherein the received computed value is a part of the input of a first function.

Various embodiments are described wherein determining the output of the first function based upon the received computed value includes XORing the received computed value with a predetermined constant.

Various embodiments are described wherein the cryptographic operation is one of advanced encryption system (AES) or data encryption standard (DES).

Various embodiments are described wherein the cryptographic implementation includes a network of finite state machines.

Various embodiments are described wherein the cryptographic implementation includes a network of lookup tables.

Various embodiments are described wherein, the computed value is received from the surrounding program by a first pointer, the surrounding program sets the computed value pointed to by the first pointer using a second pointer, the computed value received from the surrounding program is based upon one of a hash value of a code fragment, a system identifier, a user password, and a hash of a user password, and the cryptographic implementation includes a network of functions wherein a first function depends the received computed value.

Further, various exemplary embodiments relate to a method of producing a cryptographic implementation of a cryptographic operation mapping an input message to an output message in a cryptographic system that glues the cryptographic implementation to a surrounding program, including: producing a cryptographic implementation of the keyed cryptographic operation including a plurality of functions; receiving information specifying a computed value wherein a first function depends on the computed value; modifying the cryptographic implementation to receive the computed value from the surrounding program; and modifying the cryptographic implementation based upon the received computed value so that: when a received computed value is equal to the desired value, the cryptographic implementation outputs a correct output message; and when a received computed value is not equal to the desired value, the cryptographic implementation outputs an incorrect output message.

Various embodiments are described wherein the computed value is received from the surrounding program by a first pointer.

Various embodiments are described wherein the surrounding program sets the computed value pointed to by the first pointer using a second pointer.

Various embodiments are described wherein the computed value received from the surrounding program is based upon one of a hash value of a code fragment, a system identifier, a user password, and a hash of a user password.

Various embodiments are described wherein the computed value received from the surrounding program is based upon whether the cryptographic implementation is running in a debugger.

Various embodiments are described wherein when an input to a first function corresponds to a specific input, the output of the first function is determined based upon the received computed value.

Various embodiments are described wherein determining the output of the function based upon the received computed value includes XORing the received computed value with a predetermined constant.

Various embodiments are described wherein the received computed value is a part of the input of a first function.

Various embodiments are described wherein the cryptographic operation is one of advanced encryption system (AES) or data encryption standard (DES).

Various embodiments are described wherein, the computed value is received from the surrounding program by a first pointer, the surrounding program sets the computed value pointed to by the first pointer using a second pointer, the computed value received from the surrounding program is based upon one of a hash value of a code fragment, a system identifier, a user password, and a hash of a user password, wherein a first function depends on the received computed value.

Various embodiments are described wherein the functions are finite state machines.

Various embodiments are described wherein the functions are lookup tables.

Further, various exemplary embodiments relate to a non-transitory machine-readable storage medium encoded with instructions for execution by a cryptographic implementation performing a cryptographic function in a cryptographic system for gluing a cryptographic implementation to a surrounding program in a cryptographic system, the non-transitory machine-readable storage medium including: instructions for receiving, by the cryptographic system, an input message; instructions for receiving a computed value from the surrounding program; instructions for performing, by the cryptographic system, a keyed cryptographic operation mapping the input message into an output message using the computed value from the surrounding program, wherein the output message is a correct output message when the computed value has a correct value; and instructions for outputting the output message.

Various embodiments are described wherein the computed value is received from the surrounding program by a first pointer.

Various embodiments are described wherein the surrounding program sets the computed value pointed to by the first pointer using a second pointer.

Various embodiments are described wherein the input message and the output messages are unencoded.

Various embodiments are described wherein the computed value received from the surrounding program is based upon one of a hash value of a code fragment, a system identifier, a user password, and a hash of a user password.

Various embodiments are described wherein the computed value received from the surrounding program is based upon whether the cryptographic implementation is running in a debugger.

Various embodiments are described wherein the cryptographic implementation includes a network of functions and wherein when an input to a first function corresponds to a specific input, the output of the first function is determined based upon the received computed value.

Various embodiments are described wherein the cryptographic implementation includes a network of functions wherein the received computed value is a part of the input of a first function.

Various embodiments are described wherein determining the output of the first function based upon the received computed value includes XORing the received computed value with a predetermined constant.

Various embodiments are described wherein the cryptographic operation is one of advanced encryption system (AES) or data encryption standard (DES).

Various embodiments are described wherein the cryptographic implementation includes a network of finite state machines.

Various embodiments are described wherein the cryptographic implementation includes a network of lookup tables.

Various embodiments are described wherein, the computed value is received from the surrounding program by a first pointer, the surrounding program sets the computed value pointed to by the first pointer using a second pointer, the computed value received from the surrounding program is based upon one of a hash value of a code fragment, a system identifier, a user password, and a hash of a user password, and the cryptographic implementation includes a network of functions wherein a first function depends the received computed value.

BRIEF DESCRIPTION OF THE DRAWINGS

In order to better understand various exemplary embodiments, reference is made to the accompanying drawings, wherein:

FIG. 5 illustrates an example of source code for a table based implementation of an AES cryptographic function;

FIG. 6 illustrates how the table based implementation of FIG. 5 may be made to depend upon values calculated outside the white-box implementation;

FIG. 7 illustrates how the table based implementation of FIG. 6 may use pointers instead of explicit variables;

FIG. 8 illustrates how the table based implementation of FIG. 5 may be made to depend upon values calculated outside the white-box implementation that depend upon a hash value of a code fragment;

FIG. 9 illustrates an embodiment that includes the use of two pointers and a hash function to produce a variable used when an input to the table x equals r.

To facilitate understanding, identical reference numerals have been used to designate elements having substantially the same or similar structure and/or substantially the same or similar function.

DETAILED DESCRIPTION

Figure 1:
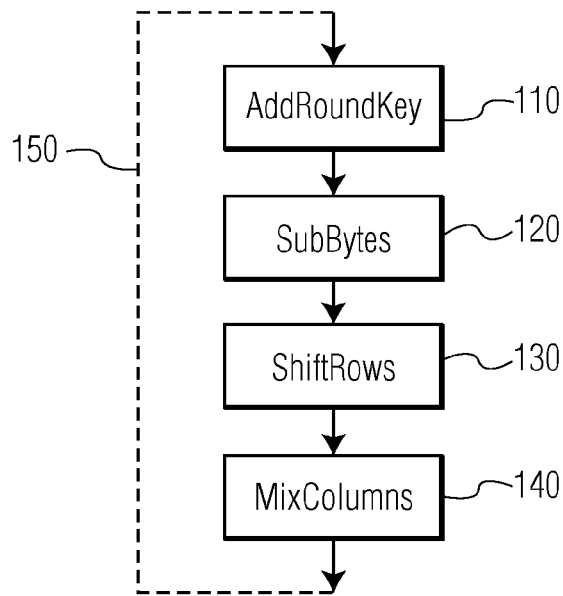
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The discussion below is directed to white-box cryptography because it is the most challenging attack model. Further, many cryptographic implementations are deployed and used in an environment where they are subject to a white-box attack. There is also a black-box attack model and a grey-box attack model. In the black-box attack model, it is assumed that the attacker only has access to the input and output of the implementation. In the grey-box attack model, it is assumed, that in addition the access to the input and the output of the implementation, that the attacker has access to side channel information regarding the execution of the implementation. Such side channel information may include power, timing, electronic emissions, etc. Accordingly, the benefits of the embodiments described below may be used to prevent any of these various levels of attack as well as others that may be defined. Therefore, where white-box implementations are described, it is intended that they may include black-box implementations as well as grey-box implementations that use the various methods described in the embodiments below.

A typical problem with a software implementation of a cryptographic algorithm is code lifting where an adversary seeks to isolate a white-box implementation from the surrounding program and use it stand-alone. This so-called code-lifting attack is generally unwanted because the surrounding program typically enforces important security settings, such as license enforcement. Accordingly, a white-box implementation, although it may effectively hide a cryptographic key, may still be distributed as a whole. This white-box implementation may be as valuable as the key itself. If, for instance, the white-box implementation implements a decryption algorithm, then by not having the key, the receiver may not be able to encrypt messages, but the white-box implementation is sufficient to decrypt messages. This means that an adversary illegitimately distributes the white-box implementation as a whole instead of the underlying hidden cryptographic key, which typically is of high value that should not be distributed in an uncontrolled way.

However, on the positive side, software solutions are relatively easy to replace. That is, once the (financial) damage caused by the illegitimate distribution of white-box implementations is considered too large, one may opt for replacing the white-box implementations by a new one. Alternatively, the key (i.e., the white-box implementation) may regularly be changed, where a new white-box implementation is not provided to users that have shown illegitimate behavior to discourage illegitimate behavior and to prevent these persons/devices from trying to copy the white-box implementation again.

Previously this problem was identified, and the use of external encodings was proposed to protect against it. This means that instead of implementing a cryptographic functionality F (such as AES), it implements $h \circ F \circ g^{-1}$ for bijective functions g and h. This means that the input to F is encoded by function g and that the output is encoded by h. By performing the input encoding and output decoding in the surrounding program, the white-box implementation is glued to this surrounding program. This approach has two important disadvantages. In the first place, a question is how to hide the input encoding and output decoding in the surrounding program. After all, it typically happens just before and after the invocation of the white-box implementation. Secondly, the encoding and decoding cannot be applied if the white-box implementation does not have a strong connection to the surrounding program such as, for example, if the input is received from a network or medium and/or the output is send over the network or stored on a medium.

In the embodiments below a different approach is described. It works as follows. In a white-box implementation, the key is typically hidden in a large set of data, sometimes referred to as white-box key. For instance, in a table-based white-box implementations the key is hidden in a large set of lookup tables. In embodiments of the invention, fragments of the white-box key may be computed in the surrounding program and stored in variables. For example, a part x of the white-box implementation is computed and stored in variables somewhere in the surrounding software. The parts x of the white-box key that are stored in the variables are removed from the white-box implementation. Then when the removed parts x of the white-box key are needed, computed values from the surrounding program are used. Then, if the surrounding program does not correctly compute the variables, the white-box implementation does not work correctly because values x from the white-box key that should have been computed are missing. Unlike the external encodings, the computation of the variables need not be done just before and after the invocation of the white-box implementation, and hence may be hidden more deeply in the surrounding program.

In order to make it difficult to identify the computation of these variables, the variables may be accessed by pointers and the use of the pointers may be obfuscated. It is known that keeping track of values assigned to pointers (aliasing) is an NP-hard problem. Also the binding does not change the interface of the cryptographic algorithm and hence may be done even if the white-box implementation does not have a strong connection to the surrounding program.

Further, the surrounding program may be obfuscated by code-obfuscation techniques to make it harder to identify the code for computing x. Further, the computation of x may be made dependent on the integrity of the system. For instance, if it is based on the hash-value of a code fragment, the value x is only computed correctly if the code fragment is not tampered with. Other possible integrity checks may include: checking an hardware identifier or checking whether the program is run in a debugger. Further, x may also be calculated from a user password or a hash of a user password.

Now an example white-box implementation of AES will be described. White-box cryptography is the discipline of implementing a cryptographic algorithm in software such that it is difficult for an attacker to find the key. Hereby, the strongest conceivable (but for software most realistic) attack model is assumed in which the adversary is assumed to have full control over and full access to the white-box implementation.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The white-box implementation may be implemented using a plurality of basic blocks. The plurality of basic blocks is interconnected, in the sense that some of the blocks build on the outputs of one or more of the previous blocks. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. In other embodiments, the key may include dynamic keys that, for example, take implicit key information and combine it with some sort of dynamic information to produce the key used in the cryptographic function. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round is includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in GF($2^8$).

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
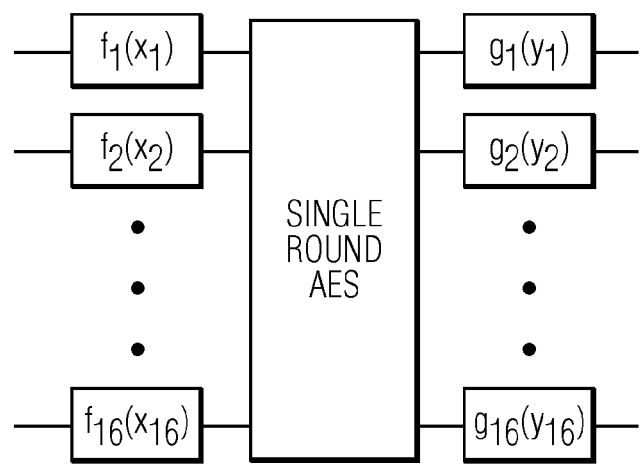
FIG. 2 illustrates a white-box AES implementation with encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j}\oplus k_{i,j})$ where $k_{i,j}$ is a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j}$, and $y_{4,j}$ via the algebraic expression $z_{l,j}=MC_{l,1}\cdot y_{1,j}\oplus MC_{l,2}\cdot y_{2,j}\oplus MC_{l,3}\cdot y_{3,j}\oplus MC_{l,4}\cdot y_{4,j}$ in $GF(2^8)$ for some constants $MC_{l,r}$.

Now define a lookup table for each byte-to-byte function $Q_{i,j,l}(x_{i,j})=MC_{l,i}\cdot T_{i,j}(x_{i,j})$ with $i, j, l=1, 2, \ldots, 16$. Then any output byte $z_{l,j}$ may be computed by XORing the results of these lookup tables, i.e., $z_{l,j}=Q_{1,j,l}(x_{1,j})\oplus Q_{2,j,l}(x_{2,j})\oplus Q_{3,j,l}(x_{3,j})\oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
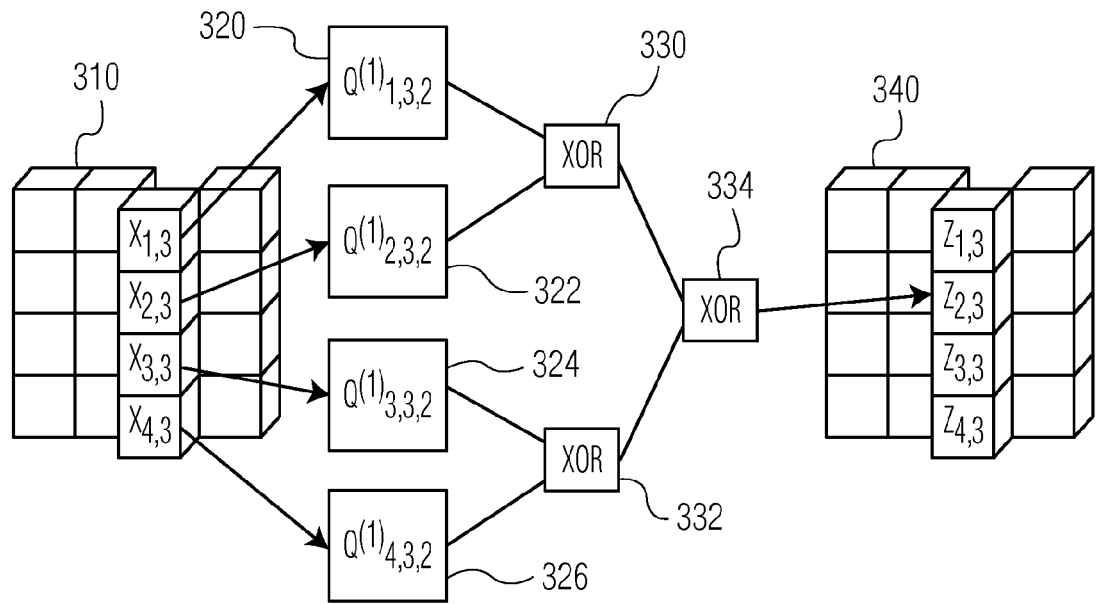
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3}$, and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
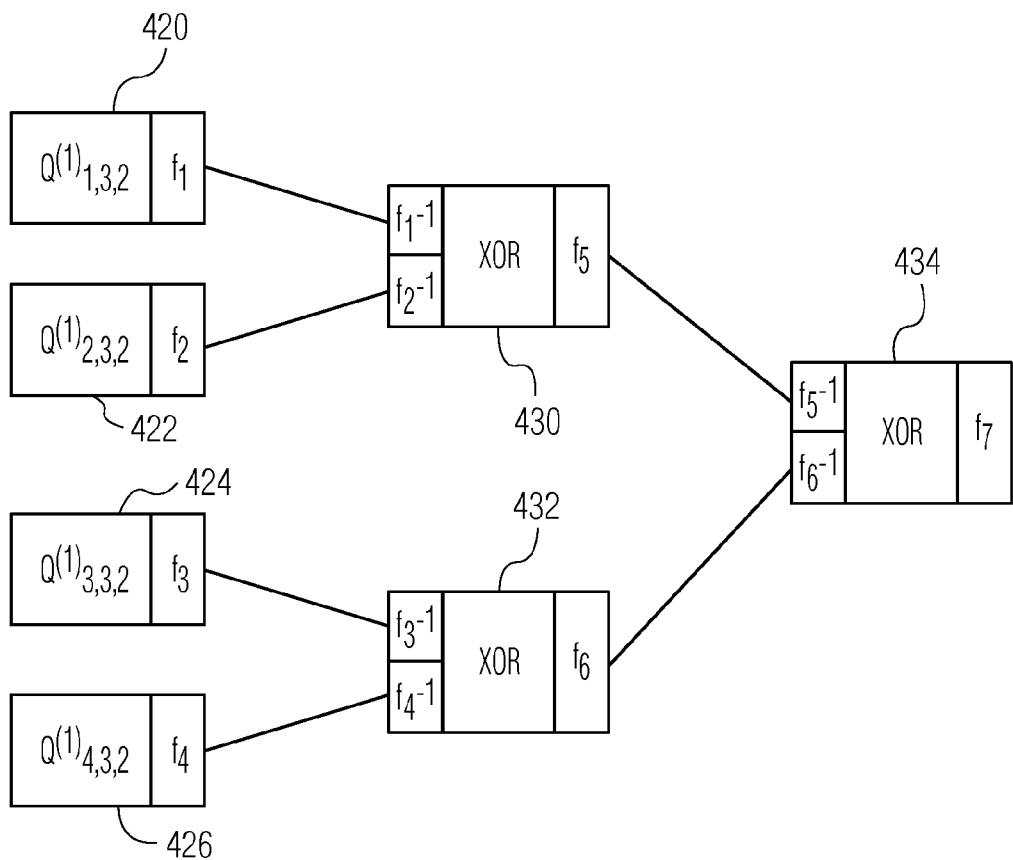
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

The description of the table lookup based white-box implementation described above was for the encryption operation of AES. It is noted that the above description is easily adapted for the encryption operation by using the inverse of the SubBytes, ShiftRows, and MixColumns operations (invSubBytes, invShitftrow, and invMixColumns). Accordingly, it is assumed that the description above can be used for either the encryption or decryption operation of AES as needed in the embodiments below.

Examples of embodiments of gluing a white-box implementation are now described. FIG. 5 illustrates an example of source code for a table based implementation of an AES cryptographic function. The source code corresponding to the described table-based white-box implementation includes instructions of the form y=T[x], where T is an array implementing a lookup table and x is the output or part of the output of a previous lookup table. This source code will include many such lookup tables. The lookup tables produce outputs that may then be inputs into other lookup tables. This network of lookup tables implement the desired white-box function.

FIG. 6 illustrates how the table based implementation of FIG. 5 may be made to depend upon values calculated outside the white-box implementation. In this example, if the input x equals the value r then the value of y is calculated based upon a variable z that may be calculated in the surrounding program. It is noted that the value C is a constant and is not computed at runtime. When the correct value of z is provided, the white-box implementation functions properly. When the incorrect value of z is provided, the white-box implementation uses an incorrect result. For values of x other than r, the lookup table T is used to calculate y. This may be expanded to include multiple input values of the lookup table T that may use external variables to determine the output value of the lookup table T. Further, many of the lookup tables in the function WB_AES may use external variables when certain input values are received by the lookup tables. It is also noted, that external variables may serve as part of the input to a lookup table. In such a case, if the input variable is incorrect, the wrong table entry is chosen and the computation based upon the lookup table is incorrect.

FIG. 7 illustrates how the table based implementation of FIG. 6 may use pointers instead of explicit variables. In this embodiment, the pointer p is used to specify the variable to be used when the input x equals r. The use of such a pointer makes it harder for an attacker to track where the variable is being calculated in order to determine the code that needs to be lifted in order to have a functioning lifted white-box implementation.

FIG. 8 illustrates how the table based implementation of FIG. 5 may be made to depend upon values calculated outside the white-box implementation that depend upon a hash value of a code fragment. In this example if the input x equals the value r then the value of y is calculated based upon a variable z that may be calculated in the surrounding program. For values of x other than r, the lookup table T is used to calculate y. Specifically, the value of z may be calculated in a function g in the surrounding program. The value of z is set equal to the hash of a code fragment P. This allows the white-box implementation to be bound to the specific code fragment. The code fragment may be code of the surrounding program, the white-box implementation, or both. If attacker tries to modify the code that is part of the code fragment, then the lookup table will produce the wrong output when the input equals r. This may thwart efforts to move a white-box implementation to another location, platform, or device. Alternatively, a device identifier may be used instead of a hash function. Such an approach ties the white-box implementation to the specific device. Further, a combination of a hash and a device identifier may be used. Both may be used to calculate a single variable or each may be used to calculate separate variables that are used by the white-box implementation. Further, the function g may detect if the software is being executed in a debugger. If so, then z is set to an incorrect value. Otherwise, the value of z is set to its correct value.

FIG. 9 illustrates and embodiment that includes the use of two pointers and a hash function to produce a computed value used when an input to the table x equals r. Again the pointer p may be used for the variable storing the computed value. Further, *p may be set equal to the hash value of the code fragment P. The value of p may be set using the pointer q. This makes it hard to localize where the value of p is set. This is illustrated in the pseudocode shown in FIG. 9. Further, an offset of 12 is used with the pointer q that further obfuscates the operation and code of the white-box implementation and the surrounding code.

The surrounding code may be obfuscated by code obfuscation techniques. This may be done with or without the use of pointers and hash values or device identifiers. The use of combinations of the various techniques for obscuring the use of a variable in the lookup tables of the white-box implementation may provide better security than using just one technique.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

In addition to the computer program being implemented on a non-transitory computer readable medium, such computer program may be transmitted to a user or user device for installation and use. This may be done over any communication network, for example, the internet.

Further, user devices implementing the embodiments described herein may include, smart cards, payment cards, transit cards, access cards and devices, mobile phones, tablets, personal digital assistants, portable and desktop computers, set-top boxes, digital video records, media streaming devices, etc. Uses of the embodiments described above may include payment software, security access, parking access, transit access and payments, banking, software and digital media transmission, secure communications, content distribution, etc.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Figure 10:
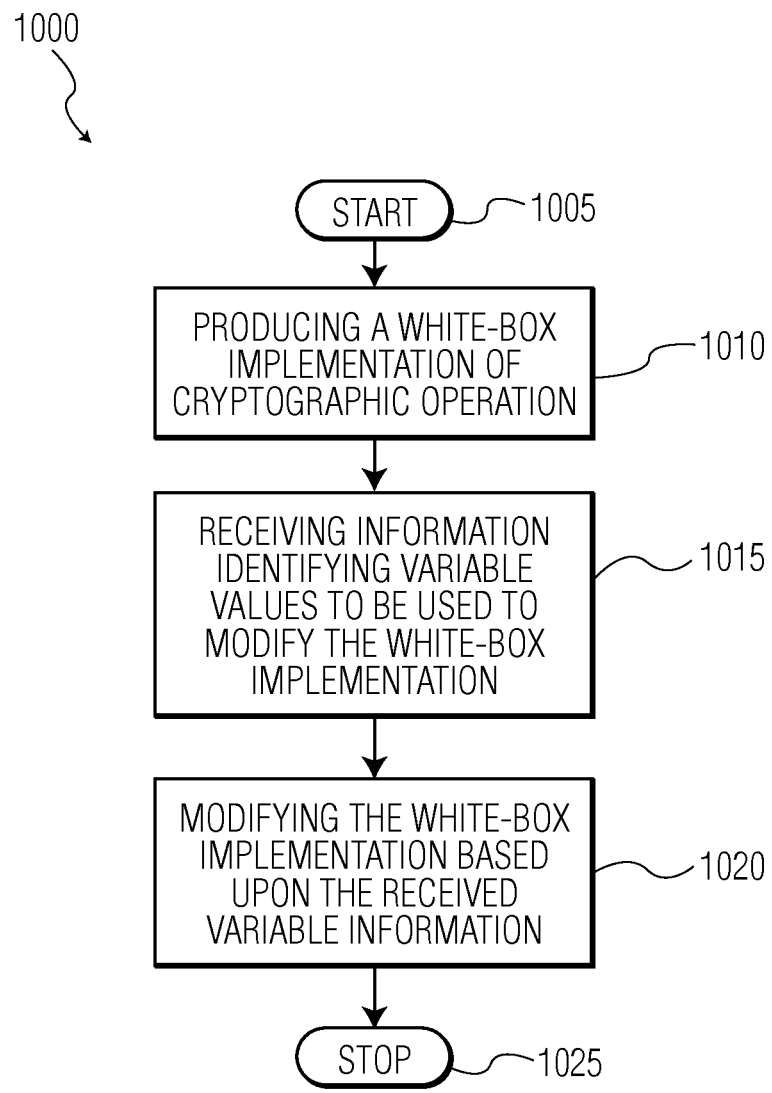
FIG. 10 is a flow chart illustrating a method of implementing a white-box implementation that is glued to a surrounding program.

FIG. 10 is a flow chart illustrating a method of implementing a white-box implementation that is glued to a surrounding program. First, the method begins 1005. Then, a white-box implementation of the cryptographic operation is produced 1010. This may be produced as described above using various methods and implementations. Next, information identifying variable values used to modify the white-box implementation are received 1015. Then, the white-box implementation may be modified based upon the received information identifying computed values used to modify the white-box implementation 1020 so that: when an input computed value is received having the correct value, the white-box implementation outputs the correct output message associated with the input message; and when an input computed value is received having an incorrect value, the white-box implementation outputs an incorrect output message associated with the input message. The method may then end 1025. It should be noted that a plurality of computed values may be received by the white-box implementation from the surrounding program.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of gluing a cryptographic implementation of a cryptographic function to a surrounding program in a cryptographic system, comprising:
   receiving, by the cryptographic system, an input message;
   receiving a computed value from the surrounding program, wherein the surrounding program computes the computed value before the cryptographic systems runs the cryptographic implementation;
   performing, by the cryptographic system, the keyed cryptographic function mapping the input message into an output message using the computed value from the surrounding program, wherein the output message is a correct output message when the computed value has a correct value, wherein the cryptographic implementation of the keyed cryptographic function includes a network of functions and wherein when an input to a first function corresponds to a specific input value, an output of the first function is determined based upon the received computed value by XORing the received computed value with a predetermined constant; and
   outputting the output message, wherein a correct output message indicates that the cryptographic implementation and surrounding program have not been tampered with.

2. The method of claim 1, wherein the computed value is received from the surrounding program by a first pointer.

3. The method of claim 2, wherein the surrounding program sets the computed value pointed to by the first pointer using a second pointer.

4. The method of claim 1, wherein the input message and the output messages are unencoded.

5. The method of claim 1, wherein the computed value received from the surrounding program is based upon one of a hash value of a code fragment, a system identifier, a user password, and a hash of a user password.

6. The method of claim 1, wherein the computed value received from the surrounding program is based upon whether the cryptographic implementation is running in a debugger.

7. The method of claim 1, wherein the cryptographic operation is one of advanced encryption system (AES) or data encryption standard (DES).

8. The method of claim 1, wherein the cryptographic implementation includes a network of finite state machines.

9. The method of claim 1, wherein the cryptographic implementation includes a network of lookup tables.

10. The method of claim 1, wherein,
    the computed value is received from the surrounding program by a first pointer,
    the surrounding program sets the computed value pointed to by the first pointer using a second pointer,
    the computed value received from the surrounding program is based upon one of a hash value of a code fragment, a system identifier, a user password, and a hash of a user password, and
    the first function depends the received computed value.

11. A method of producing a cryptographic implementation of a keyed cryptographic operation mapping an input message to an output message in a cryptographic system that glues the cryptographic implementation to a surrounding program, comprising:
    producing a cryptographic implementation of the keyed cryptographic operation including a plurality of functions;
    receiving information specifying a computed value wherein a first function depends on the computed value;
    modifying the cryptographic implementation to receive the computed value from the surrounding program, wherein the surrounding program computes the computed value before the cryptographic systems runs the cryptographic implementation; and
    modifying the cryptographic implementation based upon the received computed value so that:
    when the received computed value is equal to a desired value, the cryptographic implementation outputs a correct output message, wherein a correct output message indicates that the cryptographic implementation and surrounding program have not been tampered with; and
    when the received computed value is not equal to the desired value, the cryptographic implementation outputs an incorrect output message, wherein the cryptographic implementation of the keyed cryptographic operation includes a network of functions and wherein when an input to a first function corresponds to a specific input value, an output of the first function is determined based upon the received computed value by XORing the received computed value with a predetermined constant.

12. The method of claim 11, wherein the computed value is received from the surrounding program by a first pointer.

13. The method of claim 12, wherein the surrounding program sets the computed value pointed to by the first pointer using a second pointer.

14. The method of claim 11, wherein the computed value received from the surrounding program is based upon one of a hash value of a code fragment, a system identifier, a user password, and a hash of a user password.

15. The method of claim 11, wherein the received computed value is a part of an input of a first function.

16. The method of claim 11, wherein the cryptographic operation is one of advanced encryption system (AES) or data encryption standard (DES).

17. The method of claim 11, wherein,
    the computed value is received from the surrounding program by a first pointer,
    the surrounding program sets the computed value pointed to by the first pointer using a second pointer,
    the computed value received from the surrounding program is based upon one of a hash value of a code fragment, a system identifier, a user password, and a hash of a user password,
    wherein the first function depends on the received computed value.

18. The method of claim 11, wherein the functions are finite state machines.

19. The method of claim 11, wherein the functions are lookup tables.

20. A non-transitory machine-readable storage medium encoded with instructions for execution by a cryptographic implementation performing a cryptographic function in a cryptographic system for gluing a cryptographic implementation to a surrounding program in the cryptographic system, the non-transitory machine-readable storage medium comprising:
    instructions for receiving, by the cryptographic system, an input message;
    instructions for receiving a computed value from the surrounding program, wherein the surrounding program computes the computed value before the cryptographic systems runs the cryptographic implementation;

instructions for performing, by the cryptographic system, the keyed cryptographic function mapping the input message into an output message using the computed value from the surrounding program, wherein the output message is a correct output message when the computed value has a correct value, wherein the cryptographic implementation of the keyed cryptographic function includes a network of functions and wherein when an input to a first function corresponds to a specific input value, an output of the first function is determined based upon the received computed value by XORing the received computed value with a predetermined constant; and instructions for outputting the output message, wherein a correct output message indicates that the cryptographic implementation and surrounding program have not been tampered with.

21. The non-transitory machine-readable storage medium of claim 20, wherein the computed value is received from the surrounding program by a first pointer.

22. The non-transitory machine-readable storage medium of claim 21, wherein the surrounding program sets the computed value pointed to by the first pointer using a second pointer.

23. The non-transitory machine-readable storage medium of claim 20, wherein the input message and the output messages are unencoded.

24. The non-transitory machine-readable storage medium of claim 20, wherein the computed value received from the surrounding program is based upon one of a hash value of a code fragment, a system identifier, a user password, and a hash of a user password.

25. The non-transitory machine-readable storage medium of claim 20, wherein the computed value received from the surrounding program is based upon whether the cryptographic implementation is running in a debugger.

26. The non-transitory machine-readable storage medium of claim 20, wherein the cryptographic operation is one of advanced encryption system (AES) or data encryption standard (DES).

27. The non-transitory machine-readable storage medium of claim 20, wherein the cryptographic implementation includes a network of finite state machines.

28. The non-transitory machine-readable storage medium of claim 20, wherein the cryptographic implementation includes a network of lookup tables.

29. The non-transitory machine-readable storage medium of claim 20, wherein, the computed value is received from the surrounding program by a first pointer, the surrounding program sets the computed value pointed to by the first pointer using a second pointer, the computed value received from the surrounding program is based upon one of a hash value of a code fragment, a system identifier, a user password, and a hash of a user password, and the first function depends the received computed value.

* * * * *